United States Patent
Israni et al.

(10) Patent No.: US 9,848,607 B2
(45) Date of Patent: Dec. 26, 2017

(54) METHOD FOR NO-FLIP COOKING MECHANISM FOR A FOOD PREPARATION APPLIANCE

(71) Applicants: Pranoti Nagarkar Israni, Singapore (SG); Rishi Israni, Singapore (SG); Jui Ajit Chitale, Singapore (SG); Ali Syed Muhammad Baber, Singapore (SG)

(72) Inventors: Pranoti Nagarkar Israni, Singapore (SG); Rishi Israni, Singapore (SG); Jui Ajit Chitale, Singapore (SG); Ali Syed Muhammad Baber, Singapore (SG)

(73) Assignee: Zimplistic Pte. Ltd., Singapore (SG)

( * ) Notice: Subject to any disclaimer, the term of this patent is extended or adjusted under 35 U.S.C. 154(b) by 204 days.

(21) Appl. No.: 14/816,702

(22) Filed: Aug. 3, 2015

(65) Prior Publication Data

US 2016/0174576 A1    Jun. 23, 2016

Related U.S. Application Data

(62) Division of application No. 14/582,107, filed on Dec. 23, 2014, now Pat. No. 9,125,421.

(51) Int. Cl.
| | |
|---|---|
| *A21B 5/00* | (2006.01) |
| *A21B 5/02* | (2006.01) |
| *A21B 7/00* | (2006.01) |
| *A21C 11/00* | (2006.01) |
| *A21D 8/02* | (2006.01) |
| *A21D 8/06* | (2006.01) |
| *A47J 37/06* | (2006.01) |

(52) U.S. Cl.
CPC ............ *A21B 5/00* (2013.01); *A21B 5/02* (2013.01); *A21B 7/00* (2013.01); *A21C 11/006* (2013.01); *A21D 8/02* (2013.01); *A21D 8/06* (2013.01); *A47J 37/0611* (2013.01); *A47J 2037/0617* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,919,539 A * | 4/1990 | Drocco | ............... | A21C 1/02 366/224 |
| 5,007,820 A * | 4/1991 | Schwab | ............... | A21C 7/005 425/333 |
| 5,396,833 A * | 3/1995 | Atwood | ............... | A21C 5/00 99/349 |
| 5,630,358 A * | 5/1997 | Patel | ............... | A21C 11/00 100/303 |
| 5,714,178 A * | 2/1998 | Keener | ............... | A21C 7/01 249/115 |
| 6,067,897 A * | 5/2000 | Grieco | ............... | A21C 11/004 425/337 |
| 7,562,838 B2 * | 7/2009 | Leung | ............... | A47J 43/0727 241/282.1 |

(Continued)

*Primary Examiner* — Anne M Antonucci
*Assistant Examiner* — Renee LaRose
(74) *Attorney, Agent, or Firm* — Geeta Kadambi; Riddhi IP LLC

(57) ABSTRACT

A cooking mechanism and method of making a flat bread that does not require any flipping of the dough product and that which achieves an irregular temperature profile during the cooking process is described.

4 Claims, 6 Drawing Sheets

(56) References Cited

U.S. PATENT DOCUMENTS

| | | | | |
|---|---|---|---|---|
| 8,348,493 | B2* | 1/2013 | Brisciani | A21C 1/1425 |
| | | | | 366/142 |
| 8,695,905 | B1* | 4/2014 | Pagan | A47J 43/046 |
| | | | | 241/282.1 |
| 8,764,429 | B1* | 7/2014 | Voyatzakis | F26B 7/00 |
| | | | | 425/332 |
| 2002/0044496 | A1* | 4/2002 | Lawson | A47J 43/085 |
| | | | | 366/314 |
| 2003/0010217 | A1* | 1/2003 | Torghele | A21C 9/04 |
| | | | | 99/348 |
| 2009/0145242 | A1* | 6/2009 | Pryor, Jr. | G01L 5/009 |
| | | | | 73/856 |
| 2013/0036915 | A1* | 2/2013 | Krishnan | A47J 37/0611 |
| | | | | 99/324 |
| 2013/0176811 | A1* | 7/2013 | Anderson | B01F 7/00408 |
| | | | | 366/77 |

\* cited by examiner

METHOD FOR NO-FLIP COOKING MECHANISM FOR A FOOD PREPARATION APPLIANCE

CROSS RELATED APPLICATIONS

This application is a divisional application of a U.S. Utility application Ser. No. 14/582,107 filed on 23 Dec. 2014 are hereby incorporated by reference in its entireties for all of its teachings.

FIELD OF INVENTION

This disclosure relates generally to a method of cooking flat bread that does not require any flipping of the dough product while cooking to make the flat bread.

BACKGROUND

In conventional cooking of a roti or a dough product, one must flip the roti or the dough product to ensure both sides are cooked. However, for the sake of compactness, portable food preparation appliances cannot afford to flip the roti or dough product as the moving parts are required for the flipping motion and will undoubtedly increase the size and weight of the cooking device. Therefore, there exists a need for an invention that can cook both sides of the dough product without adding bulk to the cooking mechanism in a cooking device.

SUMMARY

Several systems and a method for cooking flat dough to cooked flat bread without the need for flipping are described. In one embodiment, the platen apparatus is a part of a compact flat bread maker and is situated after the dough ball making apparatus (not shown).

In one embodiment, a cooking method is disclosed for a food preparation appliance which does not require any flipping of the dough product and achieves an irregular temperature profile during the cooking process. In one another embodiment, as a system and method the apparatus functions and the response of the software to optimize cooking of the flat bread is dynamically adapted in response to variation flour quality, water content, and recipe selection (user input) by altering at least one of a distance, the sequence of movements and the temperature settings of the platens (includes set of platens and/or all the first upper plate and second lower platen platens in use) are performed.

The object of the invention is thus to replicate this uneven temperature profile during the cooking process for a portable food preparation appliance. However, as a portable food preparation appliance prepares dough products which are substantially flat, there is less of a chance that the dough product would have irregular surfaces to result in this desired "uneven cooking". There is therefore a need to devise a cooking mechanism for a portable food preparation appliance that is capable of varying the temperature profile during cooking.

Other features and advantages will be apparent from the detailed description, taken in conjunction with the accompanying drawings, which illustrate, by way of example, the principles of the current apparatus, system and method.

BRIEF DESCRIPTION OF FIGURES

Example embodiments are illustrated by way of example and not limitation in the figures of the accompanying drawings, in which like references indicate similar elements and in which.

Other features of the present embodiments will be apparent from accompanying drawings and from the detailed description that follows.

DETAILED DESCRIPTION

Several components for a system and method of making flat bread using a platen system for a no flipping mechanisms are disclosed. Although the present embodiments have been described with reference to specific example embodiments, it will be evident that various modifications and changes may be made to these embodiments without departing from the broader spirit and scope of the various embodiments.

The instant application is an improvement of the previous application Pranoti Nagarkar Israni (2011 and 2014) wherein a platen system using one set of platen is described. The cited application states that the platen unit may include the upper platen and the lower platen. In one or more embodiments, the surface of platens may be made of alloys of metals coated with nonstick coating. In the example embodiment, the upper platen and the lower platen may be mounted on a base and are held to supporting bars. In one instance it is stated that either of the upper platen and the lower platen or both may be enabled to rotate. The distance between the upper platen and the lower platen may be controlled through the upper weight controlled by the platen control module.

The improvements that are made in the instant invention are the platen system that is contiguous to each other or multiple of the platen maybe used in any combination. In the instant application the platen system, apparatus and method may be used for more faster and efficient processing is described. The platen system, apparatus and method allows a quicker production and simultaneous flattening and cooking function to keep up with the fast dough ball making apparatus that is described in the previous application. The apparatus, system and method also enable the temperature control of the platen system individually or together. The instant apparatus, system and method works on the principal that flattened dough needs cooking on both sides and resembles and textured as the real cooked flat bread when made by hand. The technical challenges that are overcome are the speed of cooking, novel system level controls for making a cooked flat bread and automation for making one dough ball at a time, flattening one dough ball at a time to make a flattened dough and cooking the flattened dough without flipping to resemble handmade flat bread.

Figure 1:
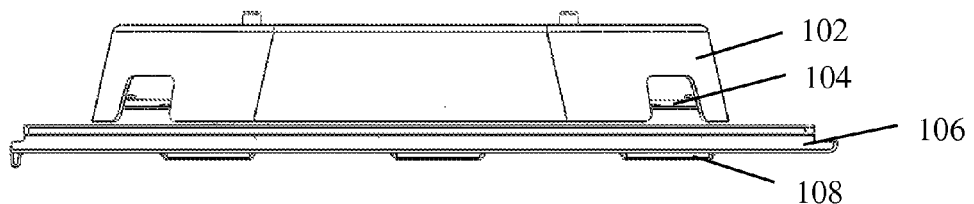
FIG. 1 shows a back cover portion of the upper platen for the first set and the second set of platen that houses the heating element.

The following paragraphs describe the apparatus, the system that controls the apparatus and the method of using the apparatus. FIG. 1 shows an enclosure 102 to cover the heating element 104. The enclosure sits on top of all platens and they are represented as 106. It could be the first set of platens on top and bottom, second surface of the first upper platen and the fourth surface of the second lower platen. This enclosure 102 is made up of insulated and heat resistant material so that it can protect the appliance from being burnt out and as well as to comply with local authority rules for insulating the heating mechanism 104. The heating element may be made up of electric coils, gas, conductance, battery power or a combination of two, but not limited to these examples. The lower part of the platen has a small separation 108 is shown if there needs to be a spacer. It may not be present in subsequent designs. The heating mechanism 104 has a specific shape, wherein the specific shape is U shape, S shape, circular shape, concentric circle, isolated individual elements located at a predetermined location and a combination thereof.

Figure 2:
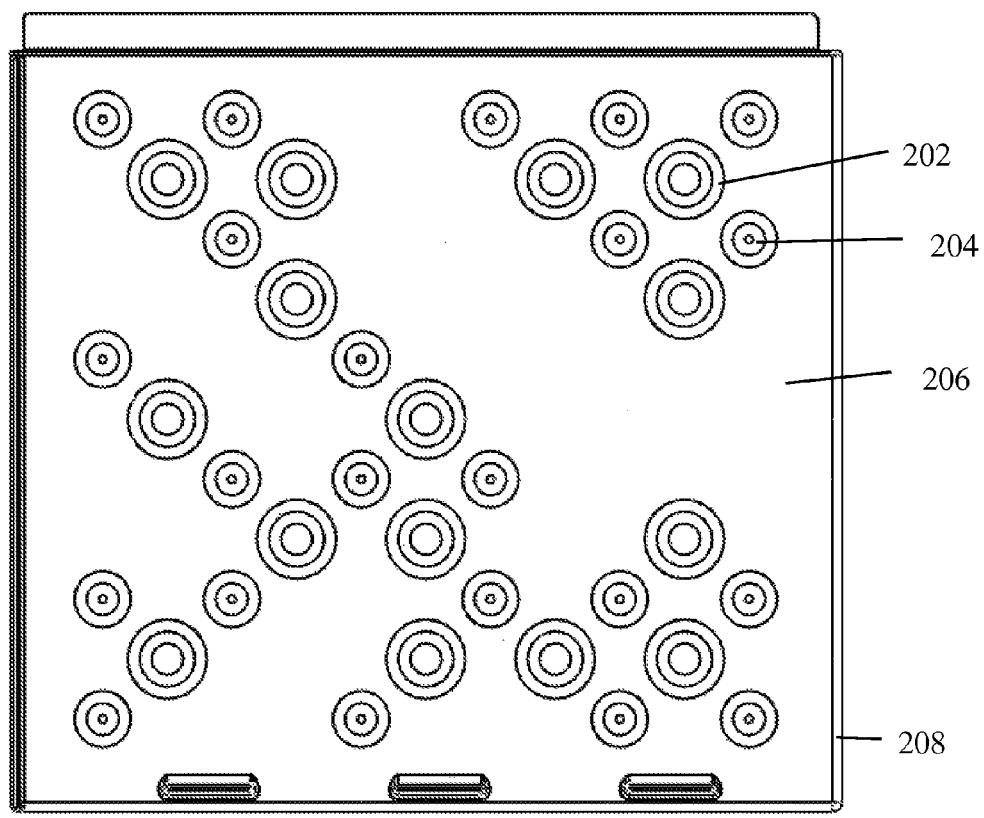
FIG. 2 shows the third surface of the lower platen with inundations for cooking unevenly.

FIG. 2 shows the second lower platen 206. Third surface (upper) of lower platen 208 comprises of specific surfaces structures such as raised surface 202 and recessed surface 204. Specific surface structure such as 202 and 204 can be of any number and in any configuration on second lower platen 102. Specific surfaces structures such as 202 and 204 can be any indentation of any depth and of any width. The regions on the third surface of second lower platen 206 which do not have specific surface structure 202 and 204 are substantially flat. The specific surfaces structure is at least one of a bubble, a circular dimple and a combination thereof. To cook a piece of flattened dough, the flattened dough would be placed in-between the first upper platen and second lower platen. Both platens would be heated using the heating mechanism. Once the temperature of the platen is sufficient the flattened dough would form a vapor in between the layers of the dough and puff up. The surface of the flattened dough may darken in some places to show the flattened dough is transformed to cooked flat bread. The cooked flat bread is then pushed out to a tray for human consumption.

Figure 3:
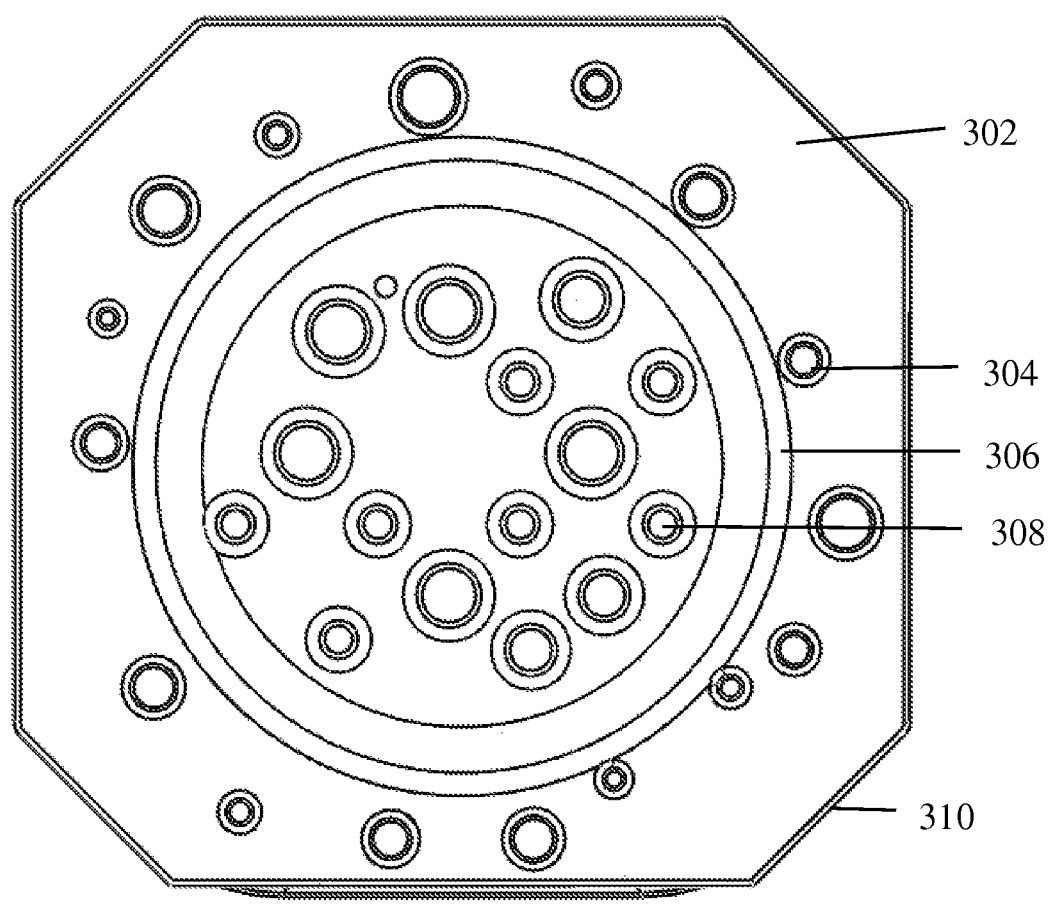
FIG. 3 shows the second surface with cooking inundation.

FIG. 3 shows the first upper platen 310 having a specific surface wherein there are no specific surface structures such as 302. There are surface differences between the region of 302 and where the raised surface 308 is located. It is separated by two concentric circles 306 to accommodate the shape of the flattened dough that is placed between the first upper platen and second lower platen for cooking. The shape and sizes of the raised or recessed surface may vary as shown in 308 and 304. The ring structure 306 also helps in holding the shape of the flattened dough and permits the raise of the flattened dough to puff up and forma cooked flattened material which is suitable for consumption immediately.

The function of specific surface structure 202, 204, 308 and 304 is to form an irregular and non-uniform surface to break up the temperature profile during cooking the flattened dough. The substantially flat regions (unique surface structure) on first upper platen 310 and second lower platen 208 will transfer heat to the flattened dough material via conduction, convection, radiation or a combination thereof while the specific surface structure 202, 204, 308 and 304 would not able to transfer heat to the dough material via conduction, convection, radiation or a combination thereof, resulting in an irregular temperature profile. The regions on the dough material corresponding to specific surface structure 202, 204, 308 and 304 would thus be heated or cooked to a lesser degree than the regions on the dough material corresponding to the substantially flat regions on first upper platen 310 and second lower platen 208. This results in uneven cooking of the flattened dough material to make handmade looking flat bread, which is desired.

Figure 4:
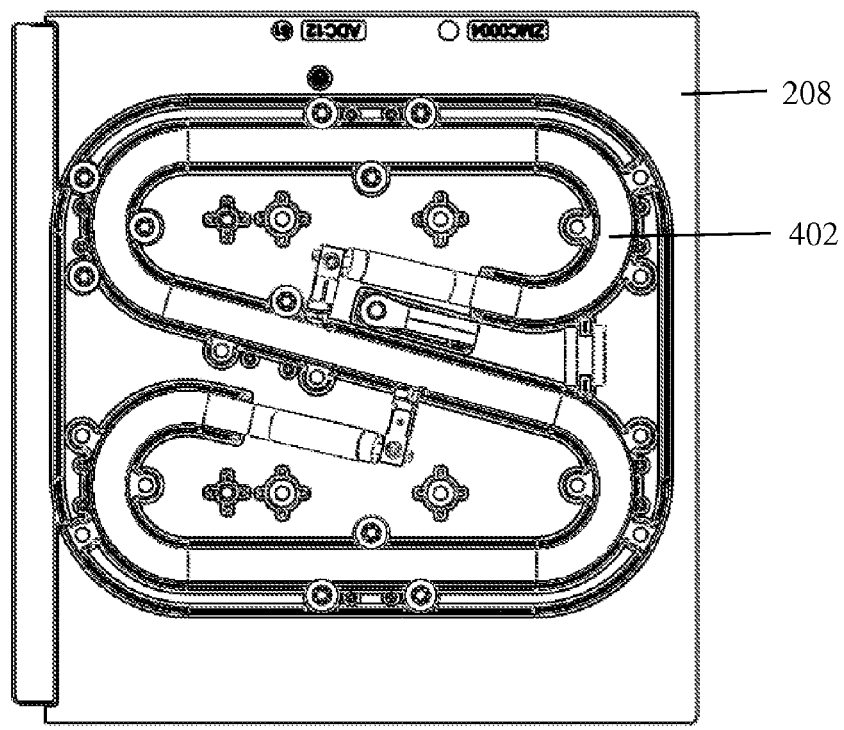
FIG. 4 shows the heating element of both upper platens.

FIG. 4 shows that the heating mechanism 402 is secured on the fourth surface of the second lower platen 208. This is covered by an insulated cover 102. The first surface and the third surface are made up of nonstick material. For example Teflon, ceramic, variations of Teflon, any nonstick coatings that is of food grade.

Figure 5:
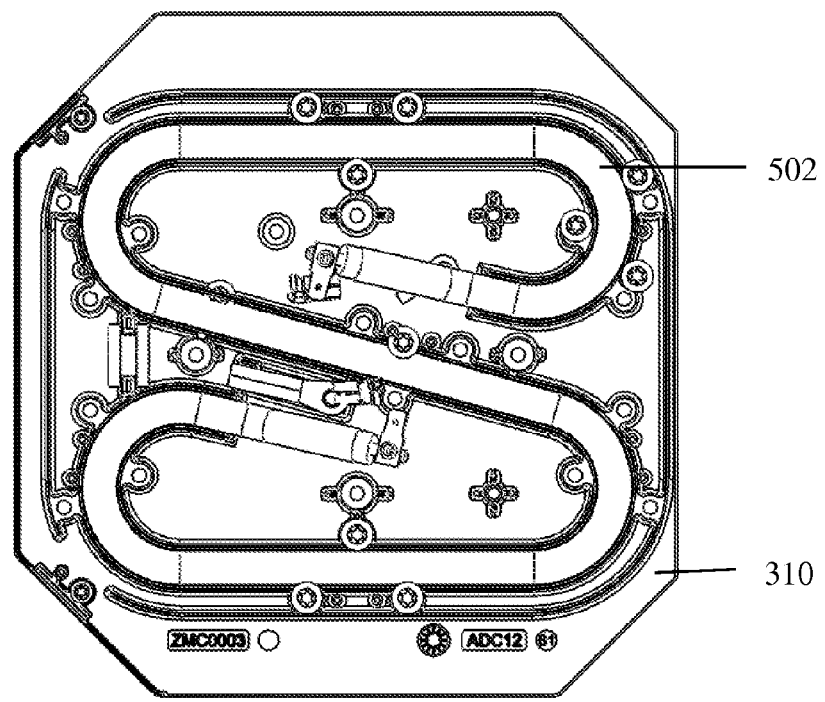
FIG. 5 shows the heating element of both lower platens.
Figure 6:
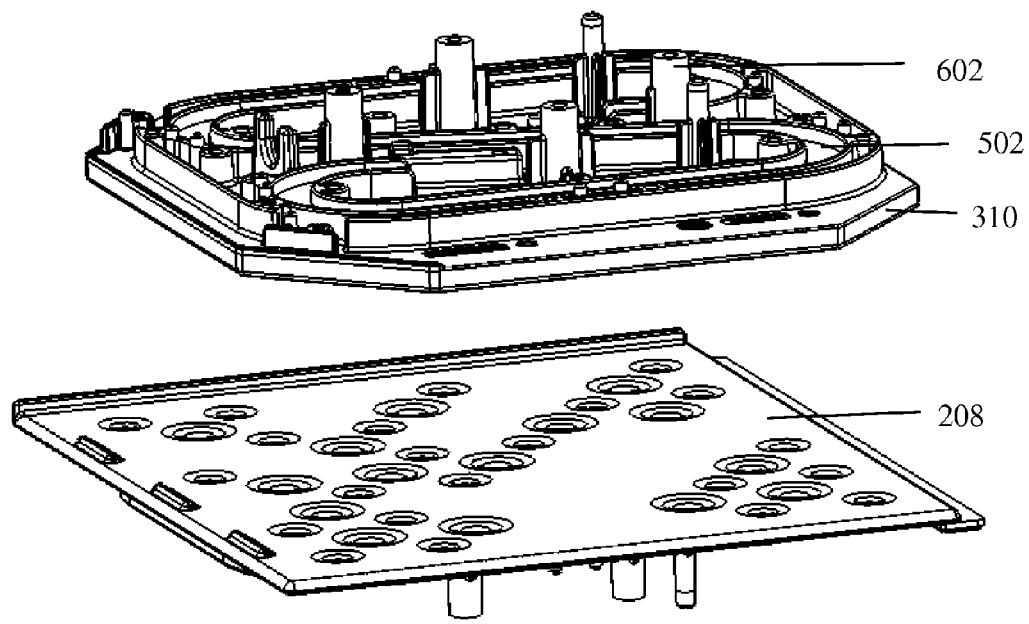
FIG. 6 shows the first upper platen and second lower platen alignment and specifically shows the second lower platen.
Figure 7:
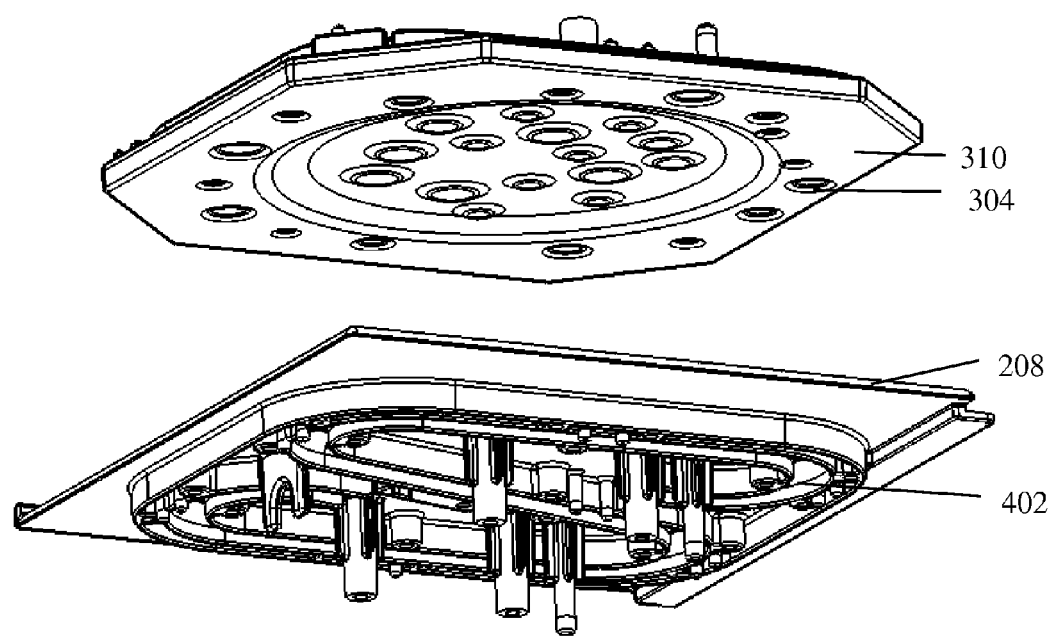
FIG. 7 shows the first upper platen and second lower platen alignment and specifically shows the first upper platen.

FIG. 5 shows the same configuration as FIG. 4 but for second surface on the first upper platen 310 having a heating mechanism 502. FIG. 6 shows the first upper platen 310 and second lower platen 208 in an aligned position as it would be in the cooking appliance to cook the flattened dough. The fixing screws would be secured in position 602 and the heating element is shown to be recessed as 502. FIG. 6 shows the angle in which specific surface structures are visible at the lower platen. FIG. 7 shows the specific surface structure in first upper platen 310 and dimple 304. Wherein the lower platen 208 is shown to display the heating element 408 in this particular angle. These two figures show the configuration of the two cooking platens to make the final cooked flattened bread. The fastening may be done using spring loaded mechanism to allow the flattened dough material to rise naturally during cooking. The amount of heat being supplied to the dough material can also be adjusted by controlling distance between first upper platen 208 and second lower platen 310 using mechanical actuation. Both the platens may have their own individual temperature control using temperature sensors and software algorithms. The set of platens used for flattening the dough have a flat inner surface that comes in touch with the dough ball and has heating elements similar to the first upper platen and the second lower platen. The temperature for these two heating mechanism is also controlled by the software to optimal level depending on the viscoelasticity of the dough ball and for creating a non-sticking flattened dough to be provided for cooking.

Figure 8:
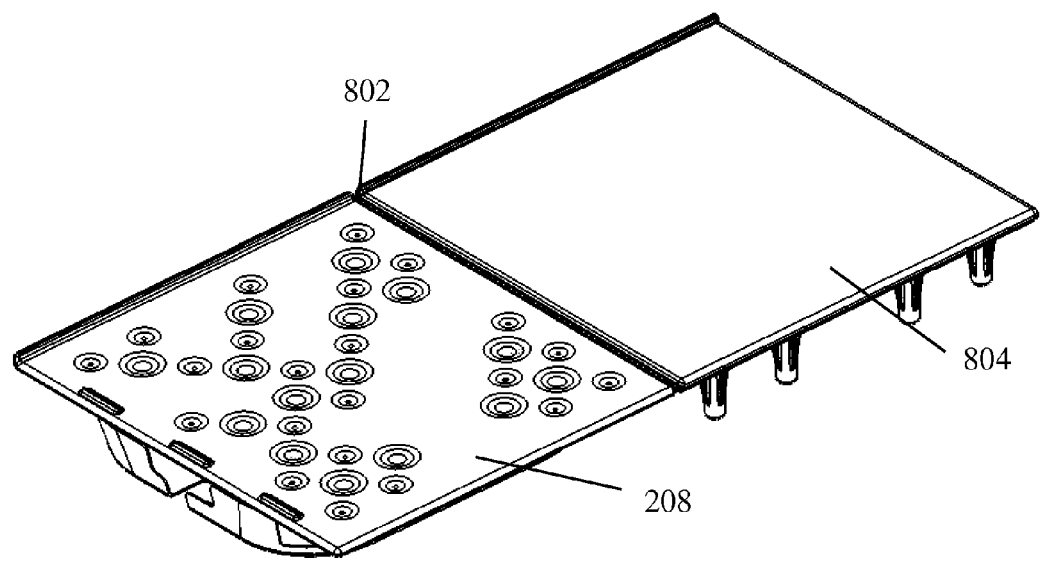
FIG. 8 shows the first set lower platen and the second set lower platen in contiguous form with each other.

FIG. 8 shows, as one embodiment, the contiguous configuration of the flattening lower pan 804 of the set of flattening pans and the second lower platen 208 of the cooking platen. The clear junction is shown as 802. Both the sets of platen may be removed and individual ones may be replaced hence the modular design to enable ease of maintenance and troubleshooting when one or the other heating mechanism requires replacement. All four platen may be heated at the same temperature or different temperatures. The entire heating mechanism is controlled using sensors and software algorithms.

Figure 9:
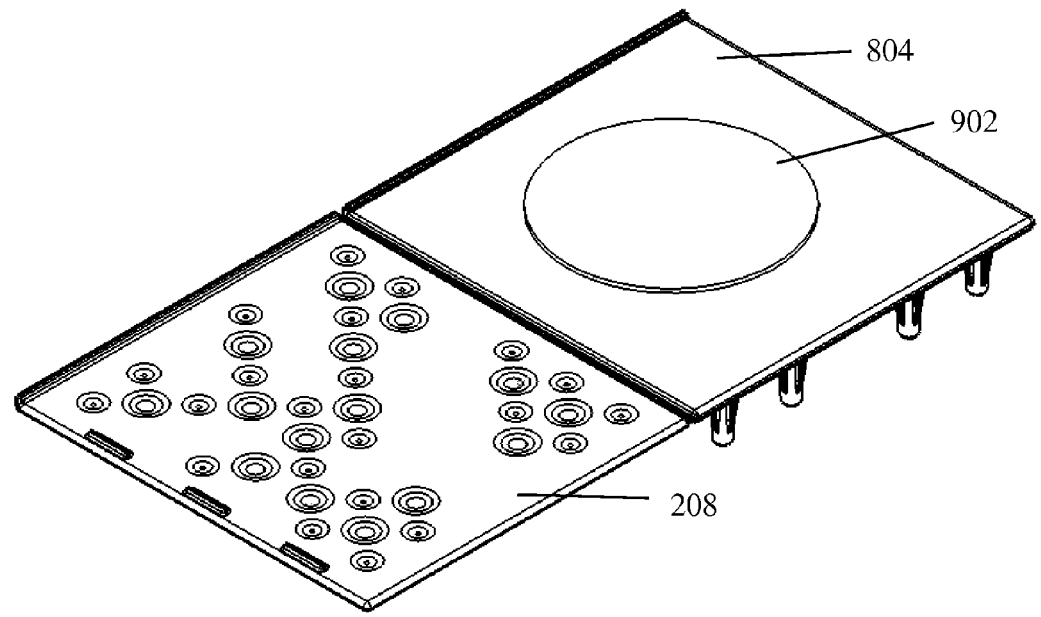
FIG. 9 shows the first lower platen having raw flat bread that has just been flattened by the set of platens.

FIG. 9 shows flattened dough 902 being produced after the set of platen gets a dough ball from the dough ball maker and places it between the set of platens to be flattened. Once it has been flattened in the platen 804 it may be transferred by a sweeper (not shown) to second lower platen 208.

Figure 10:
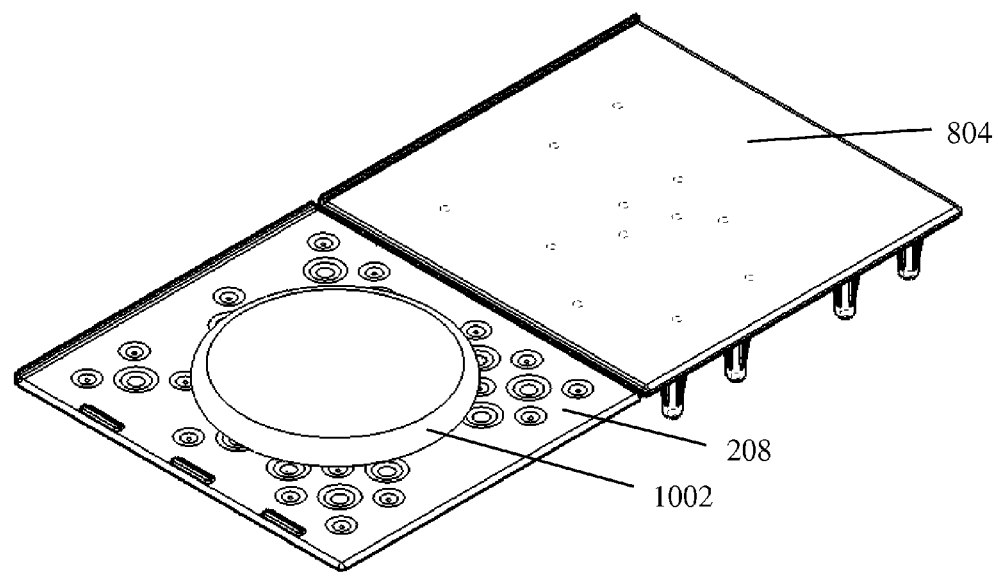
FIG. 10 shows the second lower platen having raw flat bread that is being cooked due to the heat of the lower platen.
Figure 11:
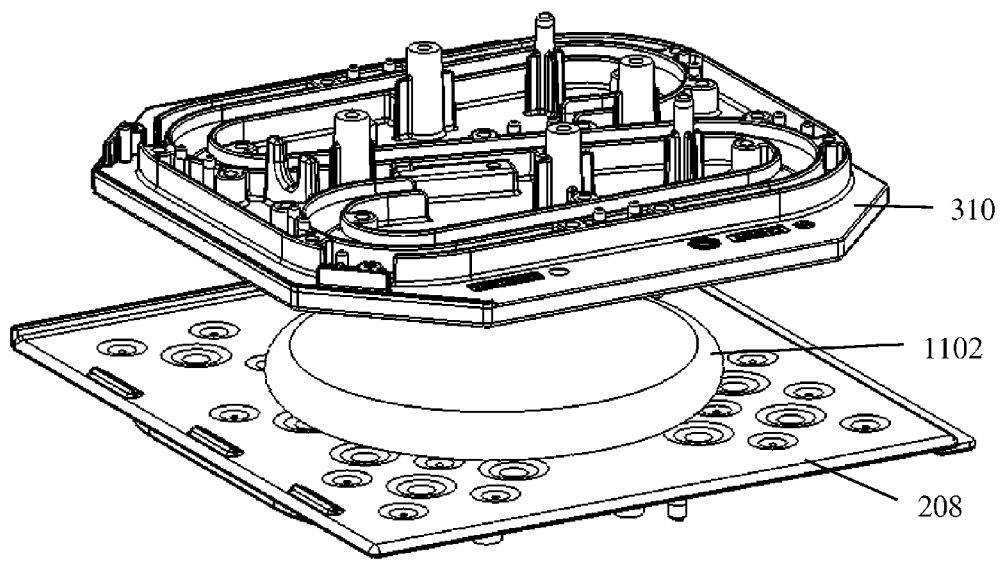
FIG. 11 shows that the first upper platen and the second lower platen is cooking the flattened bread on both sides.

FIG. 10 shows that the transfer of the flattened dough from platen 804 to second lower platen 208 has happened and due to raised heat the flattened dough has slightly puffed 1002. As shown in FIG. 11 once the first upper platen 310 and the second lower platen 208 come together to cook on both the surfaces of the flattened dough the flat bread puffs 1102 and raises due to filling of vapor and is considered cooked. The cooked flattened bread is then pushed out the compact machine for human consumption.

The method of using the apparatus is done in multiple steps. A method to make the flattened cooked bread, comprises of first flattening a dough ball using a set of flattening pans that have a smooth surface and transferring a flattened dough using a kicker to a first platen and a second platen; and subsequently cooking the flattened dough by moving the first platen and the second platen upwards and down wards and using the heat to obtain a flat bread. The sequence of cooking the flat bread also enables the first platen and second platen to move at different distances up and down for a particular cooking instance. The response of the software to optimize cooking method to make the flattened cooked bread is dynamically adapted in response to variation flour quality, water content, and recipe selection (user input) by altering at least one of a distance, the sequence of movements and the temperature settings of the platens are performed. For example, if a user chooses a preference to have thick flat bread or the flat bread is a bit more sticky than acceptable then the platens may move closer first to get the flat bread cooked well and then vary the upward and downward movement in the next sequence to puff the flat bread. The technical challenge that we are overcoming in this instance is that the current appliances have fixed distance and no intelligence to vary the distance based on user preference parameter to adapt. As described above the first upper platen has a first surface and a second surface with a specific surface structure for the first surface and the second surface for cooking the flattened dough to make the flat bread; and the second lower platen having a third surface and a fourth surface with an unique surface structure for cooking the flattened dough to make the flat bread. Some flat bread during cooking requires more heat than other type of flat bread. Traditional appliances overcome this challenge by varying the position from a hot place to a hotter place or vice versa. However, in the instant apparatus the platens using software control and sensor feedback vary the heat on demand and the flat bread need not be moved from one place to another to get cooked and/or puffed.

The upper platen may have a fan type of structure to mitigate the heating of the apparatus due to convection or conductance induced heat for cooking. Circulation of hot air and heat per se is done using fans or outlets in strategic positions in the platen apparatus.

Although the present embodiments have been described with reference to specific examples embodiments, it will be evident that various modifications and changes may be made to these embodiments without departing from the broader spirit and scope of various embodiments. Accordingly, the specification and drawings are to be regarded in an illustrative rather than a restrictive sense.

What is claimed is:

1. A method to make the flattened cooked bread, comprising:
    flattening a dough ball using a set of flattening pans that have a smooth surface;
    transferring a flattened dough from the set of flattened pans contiguous to a first platen and a second platen;
    cooking the flattened dough by moving the first platen and the second platen upwards and down wards and using a heat to obtain a flat bread; and
    controlling the method to make flattened cooked bread due to at least one of a variation flour quality, water content, and recipe selection by a user by altering at least one of a distance, the sequence of movements and a temperature settings of the platens using feedback from a sensor and a software residing in a processor.

2. The method of claim 1, wherein the first platen has a first upper platen and a second lower platen, wherein the first upper platen has a first surface and a second surface with a specific surface structure for the first surface and the second surface for cooking the flattened dough to make the flat bread; and the second lower platen having a third surface and a fourth surface for cooking the flattened dough to make the flat bread.

3. The method of claim 2, wherein the specific surface structure on the first surface is at least one of a raised surface, a recessed surface and a combination thereof.

4. The method of claim 1, wherein the second surface on the first upper platen and the fourth surface on the second lower platen has a heating mechanism of a specific type and a specific shape.

* * * * *